(12) United States Patent
Chen et al.

(10) Patent No.: US 8,298,311 B2
(45) Date of Patent: Oct. 30, 2012

(54) FILTERS WITH CONTROLLED SUBMICRON POROSITY

(75) Inventors: Peng Chen, Painted Post, NY (US); Yi Jiang, Horseheads, NY (US); Jianguo Wang, Horseheads, NY (US); Yuming Xie, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1324 days.

(21) Appl. No.: 11/599,966

(22) Filed: Nov. 15, 2006

(65) Prior Publication Data
US 2008/0110143 A1    May 15, 2008

(51) Int. Cl.
*B01D 39/06*    (2006.01)
(52) U.S. Cl. .............. 55/523; 55/522; 55/524
(58) Field of Classification Search ............ 55/522, 55/523, 524
See application file for complete search history.

(56) References Cited

U.S. PATENT DOCUMENTS

| | | | |
|---|---|---|---|
| 3,885,977 A | 5/1975 | Lachman et al. | 106/62 |
| 4,237,032 A * | 12/1980 | Evans et al. | 502/303 |
| 4,329,162 A | 5/1982 | Pitcher, Jr. | 55/523 |
| 4,390,355 A | 6/1983 | Hammond, Jr. et al. | 55/523 |
| 4,414,337 A | 11/1983 | Ichikawa et al. | 501/103 |
| 4,416,676 A | 11/1983 | Montierth | 55/523 |
| 4,483,944 A | 11/1984 | Day et al. | 502/439 |
| 4,509,966 A | 4/1985 | Dimick et al. | 55/502 |
| 4,557,773 A | 12/1985 | Bonzo et al. | 156/64 |
| 4,840,827 A | 6/1989 | Mizutani et al. | 428/116 |
| 4,855,265 A | 8/1989 | Day et al. | 501/128 |
| 5,069,697 A | 12/1991 | Hamaguchi et al. | 55/523 |
| 5,183,608 A | 2/1993 | Guile | 264/44 |
| 5,185,110 A | 2/1993 | Hamaguchi et al. | 264/44 |
| 5,258,150 A | 11/1993 | Merkel et al. | 264/43 |
| 5,290,739 A | 3/1994 | Hickman | 501/128 |
| 5,545,243 A | 8/1996 | Kotani et al. | 55/523 |
| 5,762,895 A | 6/1998 | Schwetz et al. | 423/345 |
| 6,080,348 A | 6/2000 | Shalkey | 264/177.12 |
| 6,210,626 B1 | 4/2001 | Cornelius et al. | 264/631 |
| 6,214,437 B1 | 4/2001 | Beall et al. | 428/116 |
| 6,238,618 B1 | 5/2001 | Brundage et al. | 264/638 |
| 6,254,822 B1 | 7/2001 | Brundage | 264/638 |
| 6,254,963 B1 | 7/2001 | Kondo | 428/116 |
| 6,319,870 B1 | 11/2001 | Beall et al. | 501/119 |

(Continued)

FOREIGN PATENT DOCUMENTS
WO    2004/011386    2/2004
(Continued)

OTHER PUBLICATIONS

Gaines, Richard; Skinner, Catherine; Foord, Eugene; Mason, Brian; Rosenzweig, Abraham. Dana's New Mineralogy, Eigth Edition, John Wiley and Sons, Inc. 1997.*

(Continued)

*Primary Examiner* — Jason M Greene
*Assistant Examiner* — Anthony Shumate
(74) *Attorney, Agent, or Firm* — Matthew J. Mason

(57) ABSTRACT

Porous ceramic honeycomb bodies and methods of making them, wherein the ceramic body has a total porosity (% P) defined by a median pore size ($d_{50}$) greater than or equal to 10 microns; a pore size distribution d-factor less than 0.8, wherein d-factor=$(d_{50}-d_{10})/d_{50}$, and a submicron pore fraction characterized by less than 5% of the total porosity being comprised of pores having a pore diameter less than 1.0 micron.

16 Claims, 10 Drawing Sheets

U.S. PATENT DOCUMENTS

| | | |
|---|---|---|
| 6,368,992 B1 | 4/2002 | Beall et al. .................. 501/94 |
| 6,413,895 B1 | 7/2002 | Merkel ........................ 501/134 |
| 6,432,856 B1 | 8/2002 | Beall et al. .................. 501/118 |
| 6,541,407 B2 | 4/2003 | Beall et al. .................. 501/119 |
| 6,620,751 B1 | 9/2003 | Ogunwumi ................... 501/134 |
| 6,669,751 B1 * | 12/2003 | Ohno et al. ................... 55/523 |
| 6,773,481 B2 | 8/2004 | Noguchi et al. ............... 55/523 |
| 6,773,657 B2 | 8/2004 | Beall et al. .................. 264/628 |
| 6,800,108 B2 | 10/2004 | Noda ............................. 55/523 |
| 6,803,086 B2 | 10/2004 | Noguchi et al. ............. 428/116 |
| 6,814,774 B2 | 11/2004 | Ishihara et al. ................ 55/523 |
| 6,849,181 B2 | 2/2005 | Ogunwumi et al. ....... 210/510.1 |
| 6,864,198 B2 | 3/2005 | Merkel ........................... 501/80 |
| 6,942,713 B2 | 9/2005 | Ogunwumi et al. ............ 55/523 |
| RE38,888 E | 11/2005 | Beall et al. .................. 501/119 |
| 2003/0039598 A1 | 2/2003 | Nishimura et al. ........... 422/177 |
| 2004/0020846 A1 | 2/2004 | Ogunwumi et al. ....... 210/510.1 |
| 2004/0029707 A1 | 2/2004 | Beall et al. .................. 501/119 |
| 2004/0092381 A1 | 5/2004 | Beall et al. .................. 501/134 |
| 2004/0152593 A1 | 8/2004 | Cutler et al. ................. 502/439 |
| 2004/0261384 A1 | 12/2004 | Merkel et al. .................. 55/523 |
| 2005/0046063 A1 | 3/2005 | Toda et al. ...................... 264/44 |
| 2006/0021308 A1 * | 2/2006 | Merkel ............................ 55/523 |
| 2007/0006561 A1 | 1/2007 | Brady et al. .................... 55/523 |
| 2007/0119135 A1 | 5/2007 | Miao et al. ..................... 55/523 |
| 2007/0234693 A1 | 10/2007 | Miao et al. ..................... 55/523 |

FOREIGN PATENT DOCUMENTS

| | | |
|---|---|---|
| WO | 2005/046840 | 5/2005 |
| WO | 2006/015240 | 2/2006 |
| WO | 2006/030811 | 3/2006 |

OTHER PUBLICATIONS

Webster'S Third New International Dictionary Unabridged, 1981.*

Escalas et al. (Logical Fallacies) <http://leo.stcloudstate.edu/acadwrite/logic.html> St. Cloud State University, 1998.*

Ido, T, Ogyu, K., Ohira A., Hayashi, M. and Ohno, K. (2005) "Study on the Filter Structure of SiC-DPF with Gas Permeability for Emission Control", SAE 2005-01-0578.

* cited by examiner

FILTERS WITH CONTROLLED SUBMICRON POROSITY

BACKGROUND OF THE INVENTION

The present invention relates to ceramic articles, and more particularly to ceramic articles having properties suitable for use in exhaust after-treatment applications, particularly diesel exhaust filtration.

Recently, much interest has been directed towards the diesel engine due to its efficiency, durability and economical aspects. However, diesel emissions have been scrutinized both in the United States and Europe, for their harmful effects on the environment and on humans. As such, stricter environmental regulations will require diesel engines to be held to the same standards as gasoline engines. Therefore, diesel engine manufacturers and emission-control companies are working to achieve a diesel engine which is faster, cleaner and meets the most stringent of requirements under all operating conditions with minimal cost to the consumer.

One of the biggest challenges in lowering diesel emissions is controlling the levels of diesel particulate material present in the diesel exhaust stream. In 1998 diesel particulates were declared a toxic air contaminant by the California Air Resources Board. Legislation has been passed that regulates the concentration and particle size of diesel particulate pollution originating from both mobile and stationary sources.

Diesel particulate material consists mainly of carbon soot. One way of removing the carbon soot from the diesel exhaust is through diesel traps. The most widely used diesel trap is the diesel particulate filter which filters the diesel exhaust by capturing the soot on the porous walls of the filter body. The diesel particulate filter is designed to provide for nearly complete filtration of soot without significantly hindering the exhaust flow. However, as the layer of soot collects on the surfaces of the inlet channels of the diesel particulate filter, the lower permeability of the soot layer causes a gradual rise in the back pressure of the filter against the engine, causing the engine to work harder. Once the carbon in the filter has accumulated to some level, the filter must be regenerated by burning the soot, thereby restoring the back pressure to low levels. Normally, the regeneration is accomplished under controlled conditions of engine management whereby a slow burn is initiated and lasts a number of minutes, during which the temperature in the filter rises from about 400-600° C. to a maximum of about 800-1000° C.

Porous, wall-flow ceramic filters have been utilized for the removal of carbonaceous soot particulates from the exhaust of diesel engines for more than twenty years. Ideally, a porous ceramic diesel particulate filter (DPF) should combine low CTE (for thermal shock resistance), low pressure drop (for engine efficiency, and fuel economy), high filtration efficiency (for removal of most particles from the exhaust stream), high strength (to survive handing, canning, and vibration in use), and low cost. To this end, the primary attributes effecting flow distribution and backpressure are (i) substrate microstructure, (ii) catalyst coating, (iii) soot loadings, (iv) filter geometry and (v) upstream exhaust flow rate and distribution. For a given filter geometry and upstream flow distribution and soot physical properties, the substrate microstructure, the catalystcoating distribution and the soot loadings (deep-in-wall, and soot cake) determine the resulting backpressure of the filter.

Conventional microstructure design of a DPF substrate has been mainly focused on substrate mean porosity ($\in$) and the median pore size ($d_{50}$). In fact, two filters with the same porosity and same median pore size ($d_{50}$) may have different backpressures even with same soot loading and at same flow rate, because of different pore size distributions (PSD) and/or different pore morphologies. The pore size distribution and pore morphology also contribute to the permeability of porous media, which consequently can lead to different filter backpressures even with the same porosity and same median pore size.

The quantitative impact of pore size distribution and pore morphology on the backpressure of DPF's have not been well understood in prior art yet. There is no teaching available in prior art about the control of the full pore size distribution in the way that can lead DPF's that provide for lower backpressures even at relatively high soot loadings (>5 gram/L). In particular, there has been no quantitative relationship available among substrate pore size distribution, pore morphology and porous-media permeability. Most of filter designs in prior art have been focused on the filter geometry optimization (such as cell density, web thickness), and substrate microstructure optimization such as the mean porosity and median pore size ($d_{50}$). Accordingly, there is a need in the art for a greater understanding of this quantitative relationship, and improved DPF's resulting from same.

SUMMARY OF THE INVENTION

The present invention relates to ceramic articles, and more particularly to ceramic articles having properties suitable for use in exhaust after-treatment applications, particularly diesel exhaust filtration. In one aspect, the present invention seeks to provide an understanding of the quantitative relationship among a porous substrate's full pore size distribution, pore morphology, and porous-media permeability. To this end, in one aspect, the present invention generally provides porous ceramic bodies having an optimized submicron pore microstructure.

Accordingly, in one aspect, the present invention provides a porous ceramic honeycomb body, comprising a sintered phase composition, wherein the ceramic body has a total porosity (% P) defined by a median pore size ($d_{50}$) greater than or equal to 10 microns; a pore size distribution d-factor (DF) value of less than 0.8, wherein d-factor=$(d_{50}-d_{10})/d_{50}$, and a submicron pore fraction characterized in that less than 5% of the total porosity is comprised of pores having a pore diameter less than 1.0 micron.

In another aspect, the present invention includes a porous ceramic honeycomb body in the form of a wall flow filter comprising a plurality of channels bounded by porous ceramic walls, and wherein a coating incorporating a catalyst is disposed upon at least some of the porous ceramic walls.

In yet another aspect, the present invention provides methods for manufacturing the porous ceramic articles described herein.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DETAILED DESCRIPTION OF THE INVENTION

Figure 1:
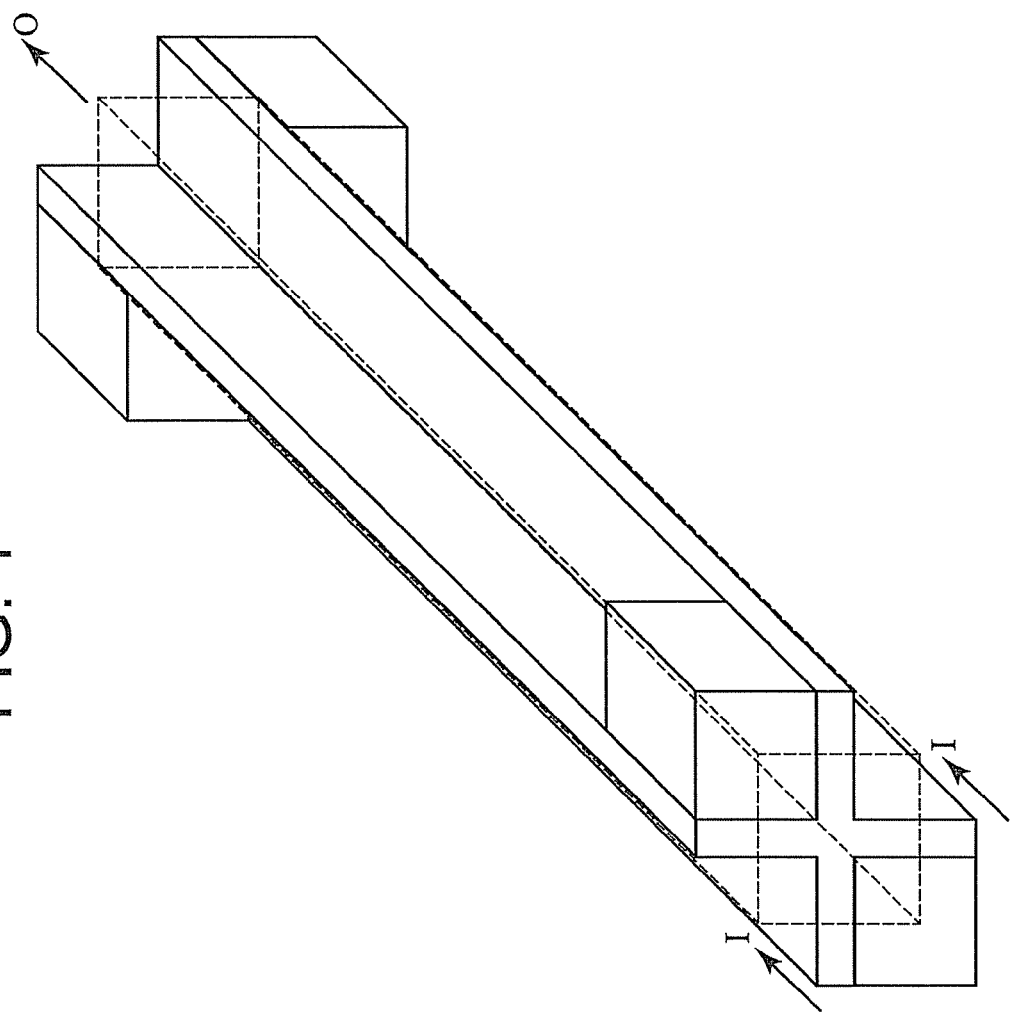
FIG. 1 illustrates an exemplary CFD simulated three-dimensional unit channel of a wall flow diesel particulate filter according to one aspect of the present invention.

The present invention is further described below with reference to the particular details and illustrative examples, it being understood that the invention is not limited to the specific articles, devices, and/or methods disclosed for purposes of illustration herein.

As briefly introduced above, the present invention provides an improved ceramic article useful for ceramic filter applications requiring high thermal durability and high filtration efficiency coupled with low pressure drop along the length of the filter. In particular, the present invention provides inventive criteria for ceramic substrate microstructure design, in particularly, for sub-micron pore size distribution control, as measured by mercury porosimetry, of a porous ceramic honeycomb body. These ceramic honeycomb bodies are, in one aspect, well suited for use as plugged, porous ceramic wall flow diesel particulate filters (DPF) and are capable of exhibiting a relatively low backpressure advantage, even in the presence of a relatively high level of soot loading, and/or washcoat/catalyst coatings.

As one of ordinary skill in the art will appreciate, washcoat and catalyst coatings often lead to a change in porosity, pore size distribution and pore morphology depending on the amount of washcoat and catalyst coated and the method of the coating used. Most conventional coating methods attempt to form lots of small pores, especially from those submicron pores due to the capillary pressure which forces the coating solution go to migrate toward those small pores of a substrate where the capillary pressure is relatively high. The resulting washcoat and catalyst coatings can either block the small pores completely, or make the submicron pores even smaller after coating. Therefore, for a given flow rate and soot loading, those small pores can significantly contribute to the increase of filter backpressure, especially under a soot-loaded condition where the permeability of filter porous body can become essential to the filter total backpressure.

Accordingly, without being limited to any one particular theory, it is contemplated that variations in pore connectivity is why backpressures of soot-loaded catalyzed filters are often increased by various percentages depending on the degree of the pore morphology existing before and after the washcoat or catalyst coating process, and also depending on the quantity of submicron pores are formed as a result of a washcoat and/or catalyst coating process.

In accordance therewith, the present invention seeks to provide a fired ceramic body having a pore microstructure that is characterized by a relatively narrow pore size distribution in combination with a controlled submicron porosity, wherein preferably no more than 5% of the total porosity of the ceramic body is provided by sub-micron pores having a pore diameter less than 1 micron. It has been found that such a microstructure enables higher levels of washcoat loadings to be applied to the filter with a minimal resulting increase in undesired backpressure.

In one aspect, the ceramic articles of the instant invention comprise a relatively high level of total porosity. For example, the ceramic articles of the instant invention can comprise a total porosity, % P, greater than 30%.

The ceramic bodies of the present invention can also comprise a relatively narrow pore size distribution evidenced by a minimized percentage of relatively fine and/or relatively large pore sizes. To this end, relative pore size distributions can be expressed by a pore fraction which, as used herein, is the percent by volume of porosity, as measured by mercury porosimetry, divided by 100. For example, the quantity $d_{50}$ is the median pore size based upon pore volume, and is measured in micrometers; thus, $d_{50}$ is the pore diameter at which 50% of the open porosity of the ceramic has been intruded by mercury. The quantity $d_{90}$ is the pore diameter at which 90% of the pore volume is comprised of pores whose diameters are smaller than the value of $d_{90}$; thus, $d_{90}$ is also equal to the pore diameter at which 10% by volume of the open porosity of the ceramic has been intruded by mercury. Still further, the quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The pore fraction $d_{10}$ can, in one aspect, be less than 1 micron. The pore fraction $d_{90}$ can, in another aspect, be more than 50 microns.

The median pore diameter, $d_{50}$, of the pores present in the instant ceramic articles can, in one aspect, be greater than 10 μm, greater than 15 μm, greater than 20 μm, or even greater than 25 μm. In another aspect, the median pore diameter can be in the range of from 10 μm to 30 μm. In still another aspect, the median pored diameter can be in the range of from 15 μm to 25 μm.

The relatively narrow pore size distribution of the inventive ceramic articles can, in one aspect, be evidenced by the width of the distribution of pore sizes finer than the median pore size, $d_{50}$, further quantified as pore fraction. As used herein, the width of the distribution of pore sizes finer than the median pore size, $d_{50}$, is represented by a "d-factor" value which expresses the quantity $(d_{50}-d_{10})/d_{50}$. To this end, the ceramic structure of the present invention in one aspect comprises a d-factor less than 0.80, less than 0.50, or even less than 0.20. In still another aspect, the ceramic structure of the present invention can comprise a d-factor in the range of from 0.10 to 0.80, or even in the range of from 0.15 to 0.50.

In addition to the pore microstructure features described above, the ceramic bodies of the present invention further comprise a controlled submicron pore structure wherein no more than 5 percent the total pore volume is comprised of pores having a diameter less than 1 micron. For example, in one aspect, no more than 5 percent of the total porosity is attributed to pore having a diameter in the range of from 0.1 micron to less than 1.0 micron, or even in the range of from 0.3 microns to less than 1.0 microns.

In a more preferred aspect, no more than 3 percent of the total porosity is attributed to pores having diameters in the range of from 0.1 micron to less than 1.0 micron, or even in the range of from 0.3 microns to less than 1.0 microns. Still further, in another preferred aspect, no more than 1 percent of the total porosity is attributed to pore having a diameter in the range of from 0.1 micron to less than 1.0 micron, or even in the range of from 0.3 microns to less than 1.0 microns. In still another aspect, no more than 0.5 percent of the total porosity is attributed to pore having a diameter in the range of from 0.1 micron to less than 1.0 micron, or even in the range of from 0.3 microns to less than 1.0 microns.

The ceramic bodies of the present invention can have any shape or geometry suitable for a particular application. In high temperature filtration applications, such as diesel particulate filtration, for which the inventive bodies are especially suited, it is preferred the bodies to have a multicellular structure, such as that of a honeycomb monolith.

An exemplary honeycomb structure can have an inlet and outlet end or face, and a multiplicity of cells extending from the inlet end to the outlet end, the cells having porous walls. The honeycomb structure can further have cellular densities from 70 cells/in$^2$ (10.9 cells/cm$^2$) to 400 cells/in$^2$ (62 cells/cm$^2$). A portion of the cells at the inlet end or face end can, in one aspect, be plugged with a paste having same or similar composition to that of the honeycomb structure, as described in U.S. Pat. No. 4,329,162 which is herein incorporated by reference. The plugging is only at the ends of the cells which is typically to a depth of about 5 to 20 mm, although this can vary. A portion of the cells on the outlet end but not corresponding to those on the inlet end are plugged. Therefore, each cell is plugged only at one end. A preferred arrangement is to have every other cell on a given face plugged as in a checkered pattern.

This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as "wall flow" filters since the flow paths resulting from alternate channel plugging require the exhaust being treated to flow through the porous ceramic cell walls prior to exiting the filter.

Ceramic diesel particulate filters having lower pressure drop have been obtained by the present invention, relative to ceramic filters of the prior art. The pressure drop across the filter is a function of the accumulation of the carbonaceous soot on the walls of the diesel particulate filter. As the amount of soot accumulated increases, it creates a progressive increase in the resistance to flow of the exhaust gas through the walls of the filter and carbon soot layer. This resistance to flow is manifested as a pressure drop that can be measured across the length of the filter, and results in an increased back pressure against the engine.

The pressure drop increase at a given loading of soot (in grams/liter) depends upon the geometry of the filter, the permeability of the ceramic wall, and the permeability of the accumulated soot layer. Geometric factors that influence pressure drop include the length and diameter of the filter, the depth of the plugs at the ends of the filter, the number of cells per unit area, and the thickness of the walls. The permeability of the clean ceramic wall, prior to soot loading, is controlled by the porosity, pore size distribution, and pore connectivity.

Furthermore, during the initial stages of soot loading, some of the soot enters into the pores on the surface of the ceramic wall. This reduces the permeability of the wall compared to the permeability of the clean wall prior to the deposition of any soot. This reduction in permeability increases the pressure drop through the filter. During these initial stages of soot loading, the extent to which the pressure drop is increased at a given soot loading depends upon the permeability of the soot that resides within the pores of the filter wall. The permeability of the soot within the pores of the ceramic wall, in turn, depends upon how densely the soot particles are packed within the pore. Soot particles that are packed more densely will result in a lower permeability of gas through the soot within the pores, and, thus, a lower permeability through the wall within which the soot resides. It has been found that the density of the packing of the soot in the wall and, thus, the permeability of the wall containing the soot, are also influenced by the porosity, pore size distribution and pore connectivity of the ceramic comprising the wall. Thus, the porosity, pore size distribution and pore connectivity influence the pressure drop of the clean and soot-loaded filter, which, in turn, affects the fuel economy and efficiency of the diesel engine.

Furthermore, controlling the pore size distribution, especially the submicron pore distribution of filter porous body, can enable one to control the catalyst coating distribution (selective coating), and improve the catalyst utilization. Otherwise, those active catalysts in small pores have very limited catalyst utilization since there is less soot particle and volumetric exhaust gaseous flow there. For a passive DPF regeneration, the interaction of soot particle and active catalyst can impact a high regeneration efficiency. To improve catalyst utilization and thermal distribution, it can be desired to have more catalyst meet with more soot particulates (such as in those medium, and larger pores), and less catalyst interact with a small amount of soot particulates (such as in those small pores).

The present invention also provides a method for manufacturing ceramic bodies having the pore microstructures described herein. The method of the present invention generally comprises the steps of first providing a plasticized ceramic precursor batch composition comprising inorganic ceramic forming batch component(s), an optional pore forming agent, a liquid vehicle, and a binder; forming a green body having a desired shape from the plasticized ceramic precursor batch composition; and firing the formed green body under conditions effective to convert the green body into a porous ceramic article.

The inorganic batch components can be any combination of inorganic components which, upon firing, can provide a primary sintered phase composition. In one aspect, the inorganic batch components can be selected from a magnesium oxide source; an alumina-forming source; and a silica source. Still further, the batch components can be selected so as to yield a ceramic article comprising cordierite, mullite, spinel, aluminum titanate, or a mixture thereof upon firing. For example, and without limitation, in one aspect, the inorganic batch components can be selected to provide a cordierite composition consisting essentially of, as characterized in an oxide weight percent basis, from about 49 to about 53 percent by weight $SiO_2$, from about 33 to about 38 percent by weight $Al_2O_3$, and from about 12 to about 16 percent by weight MgO. To this end, an exemplary inorganic cordierite precursor powder batch composition preferably comprises about 33 to about 41 weight percent aluminum oxide source, about 46 to about 53 weight percent of a silica source, and about 11 to about 17 weight percent of a magnesium oxide source. Exemplary non-limiting inorganic batch component mixtures suitable for forming cordierite include those disclosed in U.S. Pat. Nos. 3,885,977; RE 38,888; 6,368,992; 6,319,870; 6,24, 437; 6,210,626; 5,183,608; 5,258,150; 6,432,856; 6,773,657; 6,864,198; and U.S. Patent Application Publication Nos.: 2004/0029707; 2004/0261384

Alternatively, in another aspect, the inorganic batch components can be selected to provide mullite composition consisting essentially of, as characterized in an oxide weight percent basis, from 27 to 30 percent by weight $SiO_2$, and from about 68 to 72 percent by weight $Al_2O_3$. An exemplary inorganic mullite precursor powder batch composition can comprise approximately 76% mullite refractory aggregate; approximately 9.0% fine clay; and approximately 15% alpha alumina. Additional exemplary non-limiting inorganic batch component mixtures suitable for forming mullite include those disclosed in U.S. Pat. Nos. 6,254,822 and 6,238,618.

Still further, the inorganic batch components can be selected to provide alumina titanate composition consisting essentially of, as characterized in an oxide weight percent basis, from about 8 to about 15 percent by weight $SiO_2$, from about 45 to about 53 percent by weight $Al_2O_3$, and from about 27 to about 33 percent by weight $TiO_2$. An exemplary inorganic aluminum titanate precursor powder batch composition can comprises approximately 10% quartz; approximately 47% alumina; approximately 30% titania; and approximately 13% additional inorganic additives. Additional exemplary non-limiting inorganic batch component mixtures suitable for forming aluminum titanate include those disclosed in U.S. Pat. Nos. 4,483,944; 4,855,265; 5,290,739; 6,620,751; 6,942, 713; 6,849,181; U.S. Patent Application Publication Nos.: 2004/0020846; 2004/0092381; and in PCT Application Publication Nos.: WO 2006/015240; WO 2005/046840; and WO 2004/011386.

The inorganic ceramic batch components can also be synthetically produced materials such as oxides, hydroxides, and the like. Alternatively, they can be naturally occurring minerals such as clays, talcs, or any combination thereof. Thus, it should be understood that the present invention is not limited to any particular types of powders or raw materials, as such can be selected depending on the properties desired in the final ceramic body.

In one aspect, an exemplary and non-limiting magnesium oxide source can comprise talc. In a further aspect, suitable talcs can comprise talc having a mean particle size of at least about 5 µm, at least about 8 µm, at least about 12 µm, or even at least about 15 µm. In still a further aspect, the talc can be a platy talc. As used herein, a platy talc refers to talc that exhibits a platelet particle morphology, i.e., particles having two long dimensions and one short dimension, or, for example, a length and width of the platelet that is much larger than its thickness. In one aspect, the talc possesses a morphology index greater than about 0.50, 0.60, 0.70, or 80. To this end, the morphology index, as disclosed in U.S. Pat. No. 5,141,686, is a measure of the degree of platiness of the talc.

One typical procedure for measuring the morphology index is to place the sample in a holder so that the orientation of the platy talc is maximized within the plane of the sample holder. The x-ray diffraction (XRD) pattern can then be determined for the oriented talc. The morphology index semi-quantitatively relates the platy character of the talc to its XRD peak intensities using the following equation:

$$M = \frac{I_x}{I_x + 2I_y}$$

where $I_x$ is the intensity of the peak and $I_y$ is that of the reflection. Examples of commercially available magnesium oxide sources suitable for use in the present invention include, without limitation, Mistron 002 and/or FCOR Talc, both available from Luzenac, Inc. of Oakville, Ontario, Canada, and 96-67 Talc available from Barrett's Minerals, Inc. of Dillon, Mont.

Exemplary alumina forming sources can include aluminum oxides or a compound containing aluminum which when heated to sufficiently high temperature yields essentially 100% aluminum oxide. Non-limiting examples of alumina forming sources include corundum or alpha-alumina, gamma-alumina, transitional aluminas, aluminum hydroxide such as gibbsite and bayerite, boehmite, diaspore, aluminum isopropoxide and the like. Commercially available alumina sources can include relatively coarse aluminas, such as the Alcan C-700 series, having a particle size of about 4-6 micrometers, and a surface area of about 0.5-1 $m^2/g$, e.g., C-714 and C-701™. Relatively fine aluminas, having a particle size of about 0.5-2 micrometers, and a surface area of about 8-11 $m^2/g$, can also be used, such as A10 and A-16SG alumina, available from Alcoa. In still another aspect, the alumina source may be a hydrated alumina or aluminum hydroxide, e.g., AC-400 hydrated alumina, or it may be a colloidal alumina having particles sizes in the range of from 20 nm to 50 nm, such as Nyacol AL-20™ colloid available from Nyacol Nano Technologies, Inc.

If desired, the alumina source can also comprise a dispersible alumina forming source. As used herein, a dispersible alumina forming source is an alumina forming source that is at least substantially dispersible in a solvent or liquid medium and that can be used to provide a colloidal suspension in a solvent or liquid medium. In one aspect, a dispersible alumina source can be a relatively high surface area alumina source having a specific surface area of at least 20 $m^2/g$. Alternatively, a dispersible alumina source can have a specific surface area of at least 50 $m^2/g$. In an exemplary aspect, a suitable dispersible alumina source for use in the methods of the instant invention comprises alpha aluminum oxide hydroxide (AlOOH.x.$H_2O$) commonly referred to as boehmite, pseudo-boehmite, and as aluminum monohydrate. In another exemplary aspect, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities. Specific examples of commercially available dispersible alumina sources that can be used in the present invention include, without limitation, Dispal™ boehmite, commercially available from CONDEA Vista Company of Houston, Tex., and alpha alumina A1000, commercially available from Almatis, Inc.

Suitable silica sources can in one aspect comprise clay or mixtures, such as for example, raw kaolin, calcined kaolin, and/or mixtures thereof. Exemplary and non-limiting clays include non-delaminated kaolinite raw clay, having a particle size of about 7-9 micrometers, and a surface area of about 5-7 $m^2/g$, such as Hydrite MP™, those having a particle size of about 2-5 micrometers, and a surface area of about 10-14 $m^2/g$, such as Hydrite PX™ and K-10 raw clay, delaminated kaolinite having a particle size of about 1-3 micrometers, and a surface area of about 13-17 $m^2/g$, such as KAOPAQUE-10™, calcined clay, having a particle size of about 1-3 micrometers, and a surface area of about 6-8 $m^2/g$, such as Glomax LL. All of the above named materials are available from Dry Branch Kaolin, Dry Branch, Ga.

In a further aspect, it should also be understood that the silica forming source can further comprise, if desired a silica raw material including fused $SiO_2$; colloidal silica; crystalline silica, such as quartz or cristobalite, or a low-alumina substantially alkali-free zeolite. To this end, a commercially available quartz silica forming source includes, without limitation, Cerasil 300, Unimim Silverbond 200, and Imsil A25 Silica available from, Laguna Clay Co., of Byesville, Ohio. Further, in still another aspect, the silica forming source can comprise a compound that forms free silica when heated, such as for example, silicic acid or a silicon organo-metallic compound.

As set forth above, the plasticized ceramic precursor batch composition can further comprise an optional pore forming agent. Still further, the precursor composition can, if desired, contain a pore-forming agent to tailor the porosity and pore size distribution in the fired body for a particular application. A pore former is a fugitive material which evaporates or undergoes vaporization by combustion during drying or heating of the green body to obtain a desired, usually higher porosity and/or coarser median pore diameter. A suitable pore former can include, without limitation, carbon; graphite; starch; wood, shell, or nut flour; polymers such as polyethylene beads; waxes; and the like.

The inorganic batch components and the pore former component can be intimately blended with a vehicle and forming aids which impart plastic formability and green strength to the raw materials when they are shaped into a body. Forming may be done by, for example, molding or extrusion. When forming is done by extrusion, most typically a cellulose ether binder such as methylcellulose, hydroxypropyl methylcellulose, methylcellulose derivatives, and/or any combinations thereof, serve as a binder, and sodium stearate serves as a lubricant. The relative amounts of forming aids can vary depending on factors such as the nature and amounts of raw materials used, etc. For example, the typical amounts of forming aids are about 2% to about 10% by weight of methyl cellulose, and preferably about 3% to about 6% by weight, and about 0.5% to about 1% by weight sodium stearate, and preferably about 0.6% by weight. The raw materials and the forming aids are typically mixed together in dry form and then mixed with water as the vehicle. The amount of water can vary from one batch of materials to another and therefore is determined by pre-testing the particular batch for extrudability.

In addition to or as an alternative to simple cellulosic binder systems, the ceramic precursor batches may comprise reactive binders systems, examples of which are disclosed in copending, commonly assigned patent application U.S. Ser. No. 11/394,594 filed Mar. 30, 2006 for "Reactive Binders For Porous Wall-Flow Filters". Such binders will comprise combinations of reactive linear polymers such as ionene polymers in typical concentrations of 0.1-1% by weight of the batch dispersed in water-based alumina colloids (20% wt. alumina) in proportions up to 20% by weight of the batch.

The liquid vehicle component can vary depending on the type of material used in order to in part optimum handling properties and compatibility with the other components in the ceramic batch mixture. Typically, the liquid vehicle content is usually in the range of from 20% to 50% by weight of the plasticized composition. In one aspect, the liquid vehicle component can comprise water. In another aspect, depending on the component parts of the ceramic batch composition, it should be understood that organic solvents such as, for example, methanol, ethanol, or a mixture thereof can be used as the liquid vehicle.

The resulting stiff, uniform, and extrudable plasticized ceramic precursor batch composition can then be shaped into a green body by any known conventional ceramic forming process, such as, e.g., extrusion, injection molding, slip casting, centrifugal casting, pressure casting, dry pressing, and the like. In an exemplary aspect, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The instant method and the resulting ceramic structures are in one aspect especially suited for use as diesel particulate filters. Specifically, the inventive ceramic bodies are especially suited as multi-cellular honeycomb structures having a high filter volumetric heat capacity, a low pressure drop between the entrance and exit faces of the filter, a low CTE, and a high filtration efficiency. To this end, in one aspect the plasticized ceramic precursor batch composition can be formed or otherwise shaped into a honeycomb configuration. Although a honeycomb ceramic filter of the present invention normally has a structure in which a plurality of through holes opened to the end surface of the exhaust gas flow-in side and to the end surface of the exhaust gas flow-out side are alternately sealed at both the end surfaces, the shape of the honeycomb filter is not particularly restricted. For example, the filter may be a cylinder having end surfaces with a shape of a circle or an ellipse, a prism having the end surfaces with a shape of a polygon such as a triangle or a square, a shape in which the sides of these cylinder and prism are bent like an "doglegged shape," or the like. In addition, the shape of through holes is not particularly limited. For example, the sectional shape may be a polygon such as a square or an octagon, a circle, an ellipse, or the like.

Some examples of ceramic honeycombs produced by the process of the present invention generally comprise cell densities in the of range from 235 cells/$cm^2$ (about 1500 cells/$in^2$) to 15 cells/$cm^2$ (about 100 cells/$in^2$). Further, the wall or web thicknesses typically range from about 0.07 to about 0.6 mm (about 3 to about 25 mils). It should however be understood that the particular desired size and shape of the ceramic body can depend on the application, e.g., in automotive applications by engine size and space available for mounting, etc. To this end, although the ceramic articles of the instant invention are, in one aspect, suitable for preparing thin-walled honeycombs, the claimed mixtures can also be used for thicker walled structures. For example, honeycombs structures having about 15 to about 30 cells/$cm^2$ (about 100 to about 200 cells/$in^2$) and about 0.30 to about 0.64 mm (about 12 to about 25 mil) wall thicknesses are well suited for diesel particulate filter applications.

The formed green body having a desired size and shape as described above can then be dried to remove excess moisture. The drying step can be performed by hot air, microwave, steam, or dielectric drying, which can be followed by ambient air drying. Once dried, the green body can thereafter be fired under conditions effective to convert the green body into a ceramic article comprising a primary crystalline phase ceramic composition as described below.

The firing conditions effective to convert the green body into a ceramic article can vary depending on the process conditions such as, for example, the specific composition, size of the green body, and nature of the equipment used. To that end, in one aspect the optimal firing conditions needed to obtain a ceramic article according to the instant invention will be obtainable by one of ordinary skill in the art through no more than mere routine experimentation. Thus, the present invention is not limited to specific firing temperatures and times. However, in one aspect, for plasticized mixtures that are primarily for forming mullite, the firing temperature can range from about 1400° C. to about 1600° C., and the firing times can range from about 1 hour to about 6 hours. Alternatively, for plasticized mixtures that are primarily for forming cordierite, the firing conditions comprise heating the green body to a soak temperature of between about 1350° C. to about 1450° C., or between 1400° C. to 1430° C., including a soak temperature of, for example, 1425° C.

The firing times can range from approximately 20 to 250 hours, during which a maximum soak temperature can be reached and held for a soak time in the range of from about 5 hours to about 50 hours, or from about 15 hours to about 30 hours. A preferred firing schedule includes firing at a soak temperature of between about 1405° C. and 1435° C. for between about 10 hours to about 35 hours.

The concentration of submicron pores is dependent on the inorganic batch components, pore former, extrusion conditions as well as the firing schedule. Generally, a broad inorganic particle distribution and small mean particle size (clay, talc, silica and alumina, etc.) and broad organic pore formers with small mean particle size will generate submicron pores. The extrusion process operated at a high extrusion pressure with a less amount of fluid such as lubricant and water can produce more submicron pores. Firing at low ramping speed or low soaking temperature also produce submicron pores.

Figure 3:
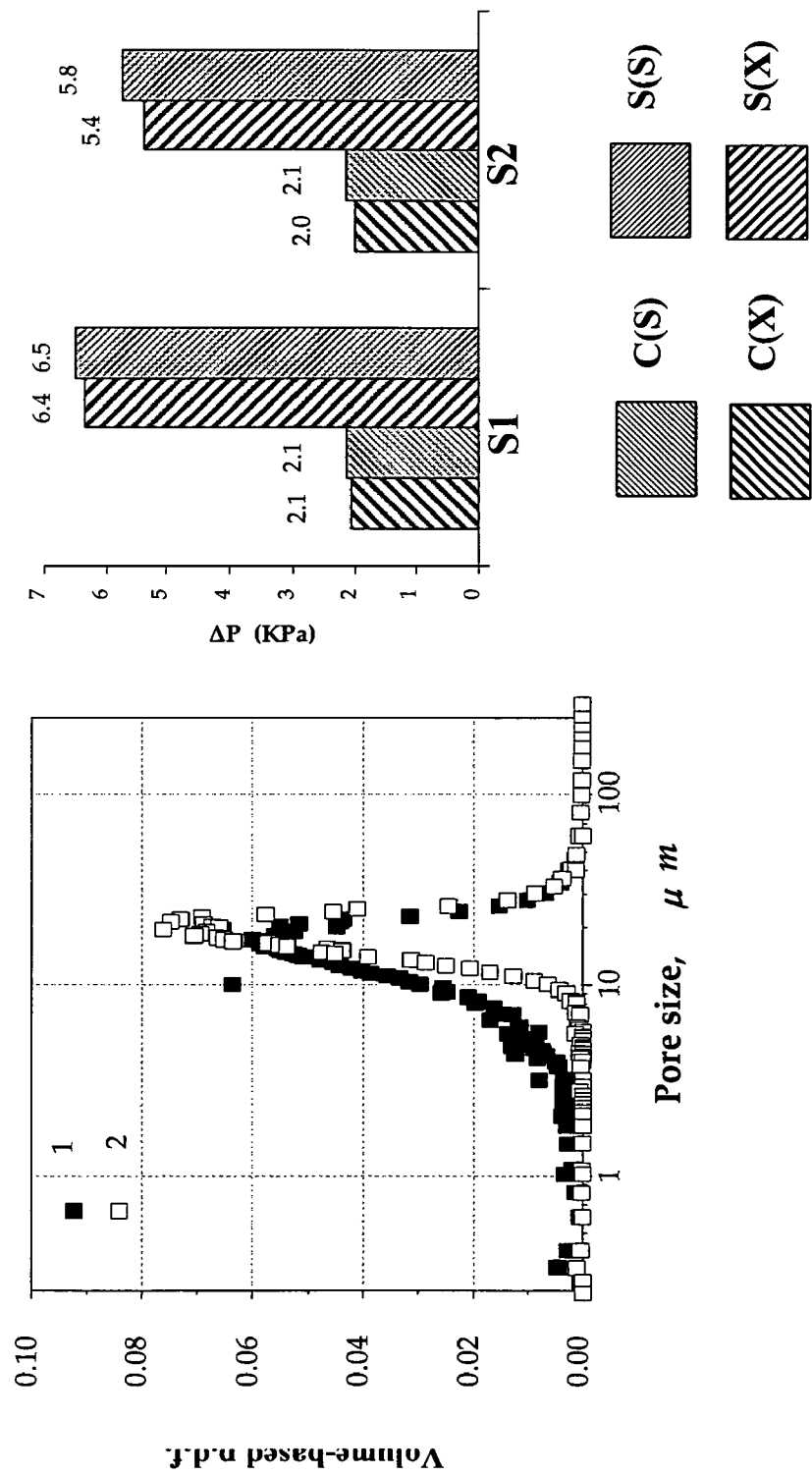
FIG. 3 graphically illustrates a comparison of CFD model predicted backpressures and experimentally measured backpressures for exemplary catalyzed and uncatalyzed diesel particulate filters according to the present invention.

FIG. 3 depicts the pore distribution profile from an identical batch extruded from two different conditions. Sample 1, extruded with 3% less of water than sample 2, has more submicron pores than sample 2. As a result, pressure drop of sample 2 was 20% less than that of sample 1 at the same 5 g/L soot loading.

To further illustrate the principles of the present invention, selected examples, intended to be purely exemplary of the invention, are presented below. Included for selected ones of those examples are both test data and computer modeling data relating to fluid flow characteristics such as pressure drops for ceramic filters made in accordance therewith. By way of background, it is known that flow-through-porous-media systems such as those described herein can be effectively modeled by comprehensive computational fluid dynamics (CFD) flow modeling software once the flow domain geometry and the permeability of porous media, fluid properties, and flow rate are determined. The exhaust fluid containing soot particulates flowing through the porous ceramic wall of a DPF is a typical system of "flow-through-porous-media".

An important aspect of modeling such systems is accounting for the porous wall permeability change due to the build up of soot particle depositions in the porous flow through walls of the filter (so-called "deep-bed" filtration phenomena). Commercialized CFD computer codes such as FLUENT® CFD from Fluent, Inc., can usefully predict single phase flow/pressure distributions in laminar flow regions (Re<20000), even with porous media involved, using a porous media permeability sub-model that accurately correlates the permeability value of the porous media with its pore structure and the "deep-bed" filtration phenomena.

FIG. 1 illustrates an exemplary three-dimensional unit channel of wall flow diesel particulate filter according to the present invention, comprising inlet (I) and outlet (O) channels and with end plugs and porous substrate walls, suitable for simulation using conventional computational fluid dynamics software. This full 3D channel geometry can be implemented in computational fluid dynamics and modeled by the porous-media model available in FLUENT® CFD software.

Sub-micron pores in sizes varying from 0.1 up to 1 micron can also result from the application of washcoats/catalysts to the porous filter walls, the pores sizes depending on the particle size of the coating slurry and/or the particular coating method. Implementing porous media models for coated filter systems will take into account the fact that the pore morphology or degree of connectivity of pores in the filter system shifts toward a relatively high probability of so-called "flow-paths-in-series" because some previous connected pores (forming so-called "flow-paths-in-parallel") can become partially or even completely blocked by the washcoat and/or catalyst coating. Such blockage results in a reduction in the probability of "flow-path-in-parallel" connectivity.

Figure 2:
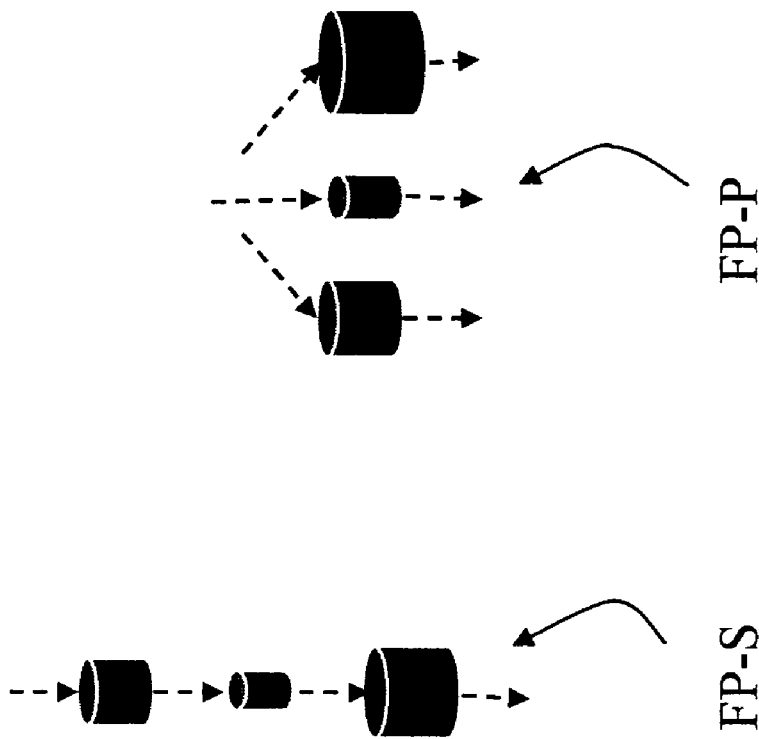
FIG. 2 is a schematic illustration of a resistance network, indicating a full pore distribution, a flow-path-in-series, and a flow-path-in-parallel.
Figure 2:
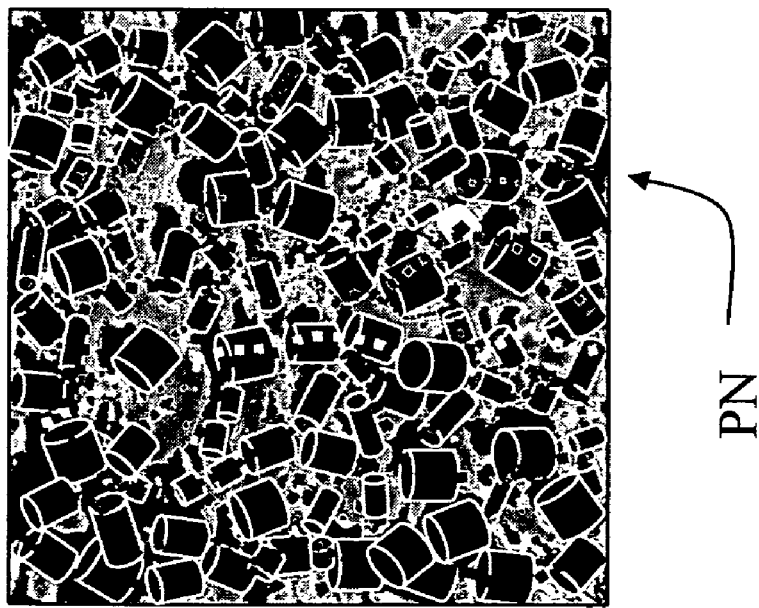

The "resistance network" concept underlies the more comprehensive porous-media permeability sub-model implementations in CFD "flow-through-porous-media" flow/pressure simulations. A schematic illustration of the resistance network concept is shown in FIG. 2, including schematic representations of a porous network PN, a flow path in series FP-S, and a flow path in parallel FP-P. Using a permeability sub-model based on this concept the full pore size distribution (PSD) and the pore morphology of the filter system are taken into account, with the probabilities of so-called "flow-paths-in-series" and "flow-paths-parallel" being set depending upon the pore morphology of the entire filter system.

For the purposes of the CFD simulated examples reported herein, the probability of a "flow-path-in-parallel" morphology is used to index the pore connectivity factor ($C_f$). As used herein, a $C_f$ value of 50% (or 0.50 in fraction) means in the pore network structure there is about a 50% probability of "flow-path-in-parallel" ($C_f$=0.5) and about a 50% probability of the "flow-path-in-series" (1−$C_f$=0.5). As suggested, sub-micron pores are typically dominant in the "flow-path-in-series" whereas one-micron or larger pores are typically dominant in the "flow-path-in-parallel". All individual sizes of open pores within the pore network of course contribute to the macroscopic permeability of the porous media.

For purposes of the CFD simulated examples reported herein, the resistance for each flow path morphology ($R_s$ for series or $R_p$ for parallel) is modeled utilizing the following equations, wherein the variable $w_i$ denotes the volume percentage of a given size of pores making up the total pore volume of the material and Ri is the resistance to gas flow contributed by the given size of pores:

$$R_s = \sum w_i R_i \qquad \text{Eq. 1}$$

$$R_p = \frac{1}{\sum \frac{w_i}{R_i}} \qquad \text{Eq. 2}$$

Further, the overall resistance R of the porous network is modeled in consideration of both path morphologies as well as all pore sizes according to the following equation:

$$R = (1 - C_f)\sum w_i R_i + C_f \frac{1}{\sum \frac{w_i}{R_i}} \qquad \text{Eq. 3}$$

while the permeability of the porous network is modeled according to the following equation:

$$\frac{1}{K} = (1 - C_f)\sum w_i \frac{1}{K_i} + C_f \frac{1}{\sum w_i K_i} \qquad \text{Eq. 4}$$

In the above equations, $K_i = k_0 \in d_i^2$ for a clean (no soot) filter, $K_i = f(\in, d_i, n_i)$ for a soot loaded filter, $C_f$ is the aforementioned pore connectivity factor (ranging from 0.0 to 1.0 based on the pore morphology of the network), $n_i$ refers to the pore number density, $\in$ denotes the porosity of the network, $d_i$ is a given pore size within the range of pore sizes present, and $k_0$ is a constant derived from the Ergun equation.

A number of cordierite ceramic honeycomb wall-flow filters of varying porosity and controlled sub-micron pore size distribution are prepared from suitable batch mixtures containing sources of magnesia, alumina and silica by extrusion, drying, firing to cordierite, and conventional honeycomb plugging to develop a wall-flow filter configuration. Comparisons are then made between experimental filter pressure drop characteristics and predicted (modeled) pressure drop characteristics, the latter being based on computational fluid dynamic modeling as described above. Representative examples of those filters and their manufacture are set forth in the following Tables.

TABLE 1

Cordierite precursor batch compositions

| Batch Component | Parts by weight of batch | |
|---|---|---|
| | Batch #1 | Batch #2 |
| Talc | 39.5 | 40 |
| Coarse alumina | 12 | 21.5 |
| Powdered silica (quartz) | 13.5 | 22.2 |
| Hydrated alumina (aluminum hydroxide) | 16 | 16.4 |
| Raw kaolin clay | 17.2 | — |
| Graphite pore former | — | 10 |
| Starch pore former (potato) | 10 | — |
| Methylcellulose binder | 4 | 6 |
| Lubricant (metal stearate) | — | 1 |
| Surfactant/lubricant (triethanol amine, tall oil) | 8 | — |
| Chemical cross linker | 2.5 | — |
| Reactive binder (ionene polymer + alumina colloid) | 18 | — |

Cordierite ceramic precursor batches such as described in Table 1 above may be extruded into honeycombs, dried, and then fired utilizing any of various known firing treatments. Examples of firing treatments suitable for that purpose are set out in Table 2 below; those schedules include firing schedules comprising peak firing temperatures in the 1410-1425° C. range and average heating rates through the reported firing cycles that fall in the 7°-20° C./hour range. Two of the schedules involve intermediate temperature holds to control precursor consolidation and/or reaction sintering. In general, Schedule 2 in Table 2 will produce porous ceramics wherein more sub-micron pores are present.

TABLE 2

Cordierite Firing Schedules

| | Schedule 1 | Schedule 2 | Schedule 3 |
|---|---|---|---|
| Avg. Heating Rate 1 | 12° C./hr | 14° C./hr | 20° C./hr |
| Temp 1 | 725° C. | 1020° C. | 650° C. |
| Hold 1 | — | 16 hrs | 30 hrs |
| Avg. Heating Rate 2 | 40° C./hr | 7° C./hr | 20° C./hr |
| Temp 2 | 1425° C. | 1410° C. | 1425° C. |
| Hold 2 | 8 hrs | 11 hrs | 15 hrs |

FIGS. 3, 4, 5, and 6 of the drawings present comparisons of backpressure data generated through CFD modeling of selected filter designs as above described with experimental data for the same filter designs, both being reported in kPa of pressure drop across the filters. Data are presented for multiple ceramic compositions as well as for both bare (uncatalyzed) filters and filters supporting washcoatings supporting catalysts.

The reported data in each case include separate plots of the volume-based probability distribution functions (p.d.f.) over the range of observed pore sizes for each of the filters together with the comparative pressure drop results for the modeled and experimentally evaluated filters. The comparative pressure drop data indicate the effect of changing pore size distributions on measured and predicted backpressures resulting from artificial soot loadings of up to 5 grams/L and at various flow rates.

Referring more particularly to the drawings, FIG. 3 shows backpressure modeling and experimental results for two filters of differing pore size distribution, porosity and pore morphology but with a common 2"×6" cylindrical filter sample geometry. Both filters have a cell density of 200 cells per square inch of filter cross-section and a wall thickness of 0.021 inches. Recorded for Samples 1 (S1) and 2 (S2) are simulated clean C(S) and soot-loaded S(S) pressure drops as compared with experimental clean C(X) and soot-loaded S(X) pressure drops. The validity of the CFD models is clearly evident from these data.

Figure 4:
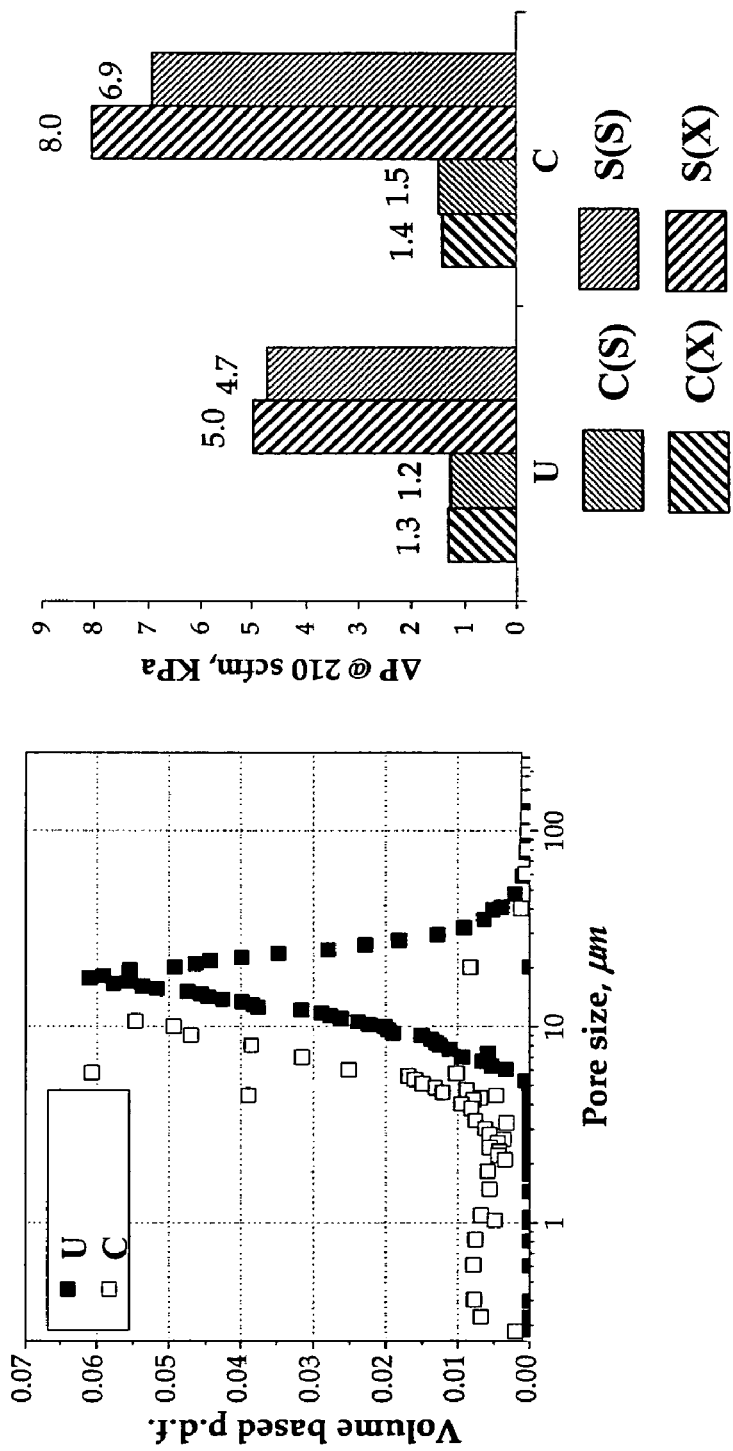
FIG. 4 graphically illustrates a comparison of CFD model predicted backpressures and experimentally measured backpressures for exemplary catalyzed and uncatalyzed diesel particulate filters according to the present invention.

FIG. 4 shows similar model-validating results for backpressure simulations and experiments on catalyzed (C) and uncatalyzed (U) cylindrical particulate filter samples of 5.66" (diameter)×6" (length) geometry and of known porosity and pore size distribution, in this case having a cell density of 200 cells per square inch and a wall thickness of 0.012 inches. Again both simulated (S) and experimental (X) pressure drops are reported.

Figure 5:
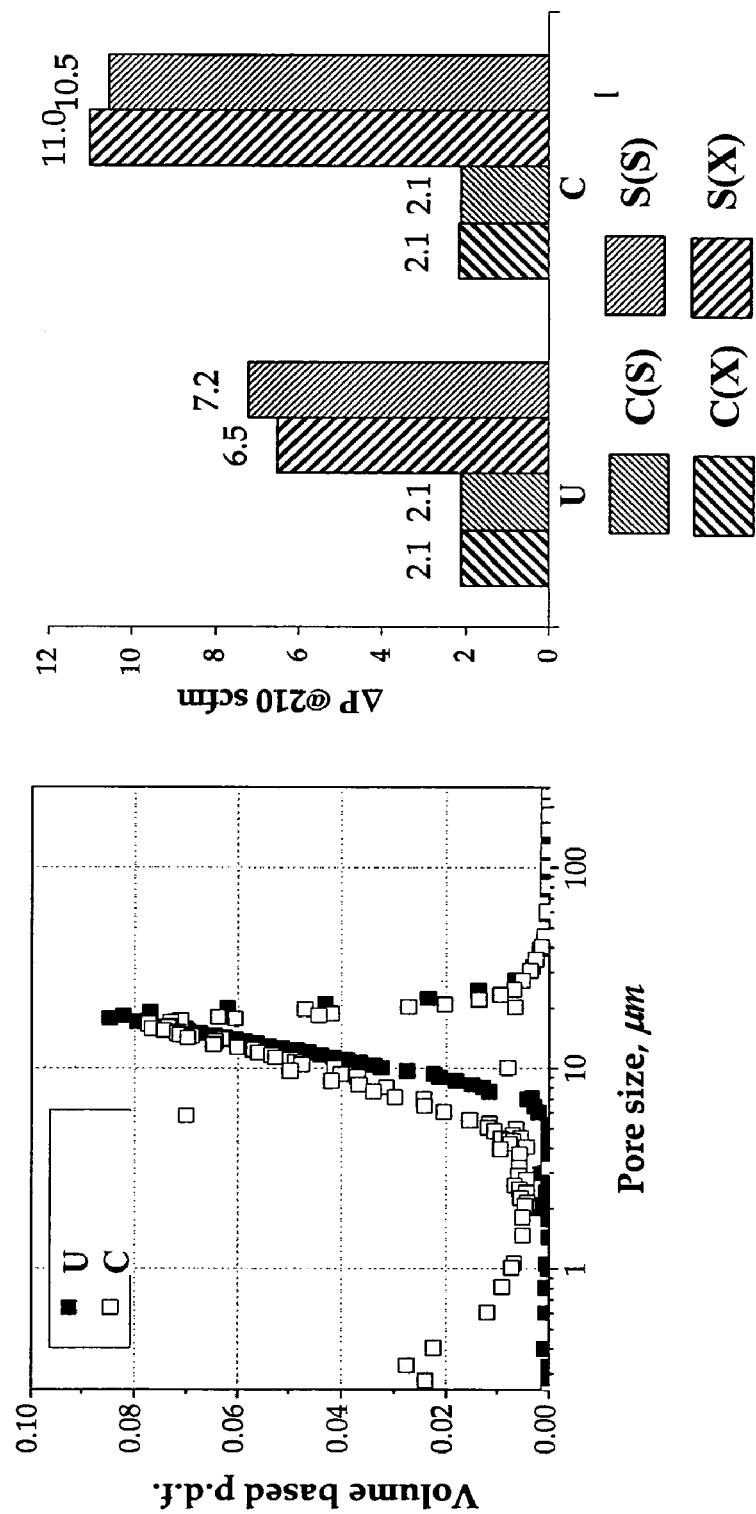
FIG. 5 graphically illustrates a comparison of CFD model predicted backpressures and experimentally measured backpressures for exemplary catalyzed and uncatalyzed diesel particulate filters according to the present invention.

FIG. 5 shows presents similarly generated backpressure results for catalyzed and uncatalyzed filters similar to those evaluated in FIG. 4, but for a 5.66"×6" DPF filter geometry of 200 cells per square inch with a wall thickness of 0.019 inches. Both the modeled and experimental data show backpressure increases associated with an increased volume percentage of sub-micron pores.

Figure 6:
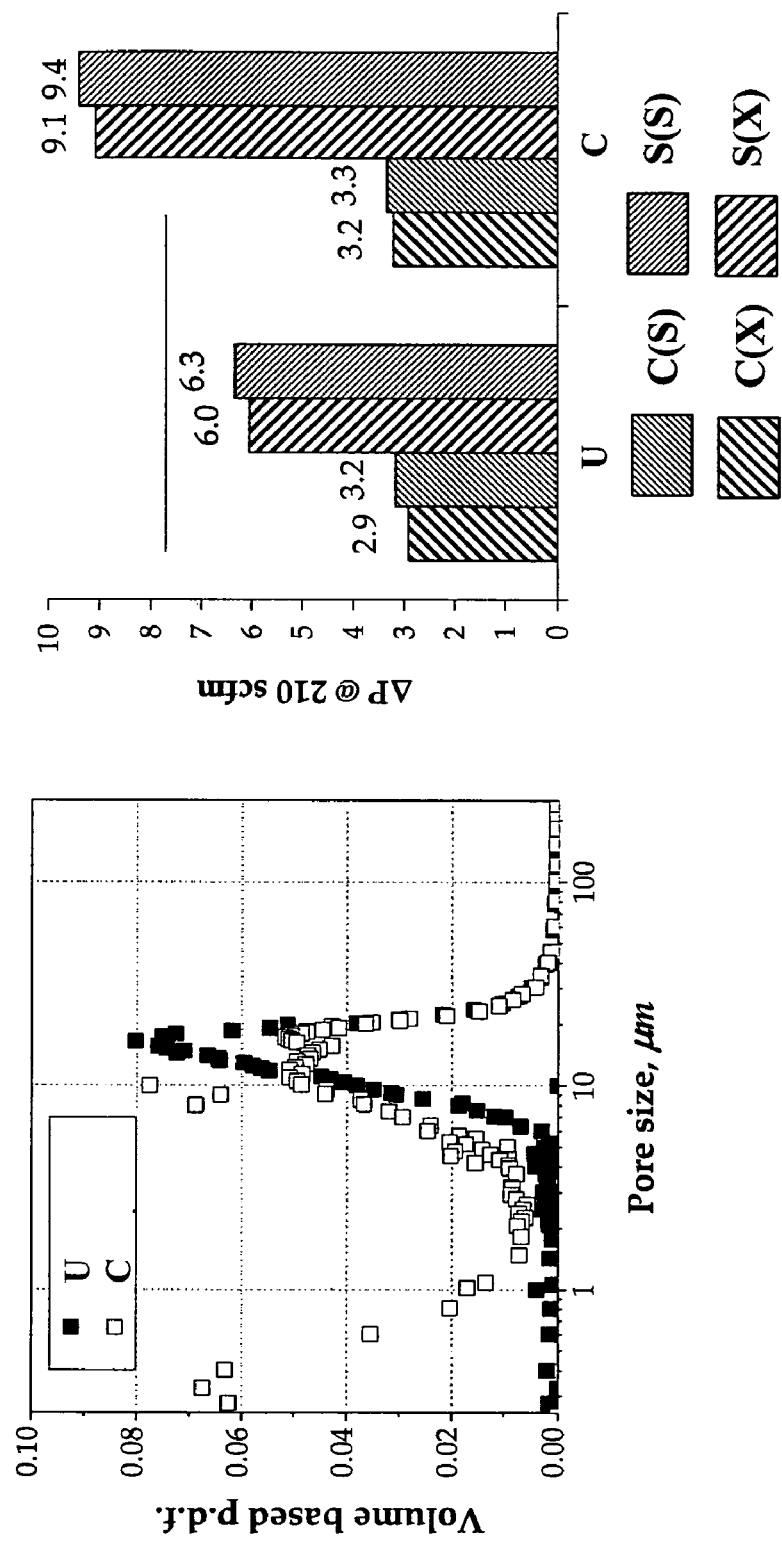
FIG. 6 graphically illustrates a comparison of CFD model predicted backpressures and experimentally measured backpressures for exemplary catalyzed and uncatalyzed diesel particulate filters according to the present invention.

FIG. 6 shows further CFD modeling and experimental pressure drop results for 5.66"×6" DPF filter samples having cell densities of 300 cells per square inch and wall thicknesses of 0.017 inches. Again, the measured and simulated backpressures increase along with the observed increased in the volume percentage of sub-micron pores.

As is known, the application of catalyst and washcoating layers to porous ceramic filters generally results in decreases in the porosity of the porous ceramics, the amount of the decrease depending on variables such as the amount of catalyst coating deposited into the pores of the porous body and the particular application technique used. With most coating formulations, the coating solution has a strong tendency to fill relatively smaller pores due to the capillary forces arising when the coating solution contacts the substrate material, this filling generally leading to the formation of even smaller pore sizes. Accordingly, the median pore size $d_{50}$ often decreases after washcoat and catalyst coating(s) have been applied as smaller submicron pores (no larger than 1 μm) are typically formed.

Figure 7:
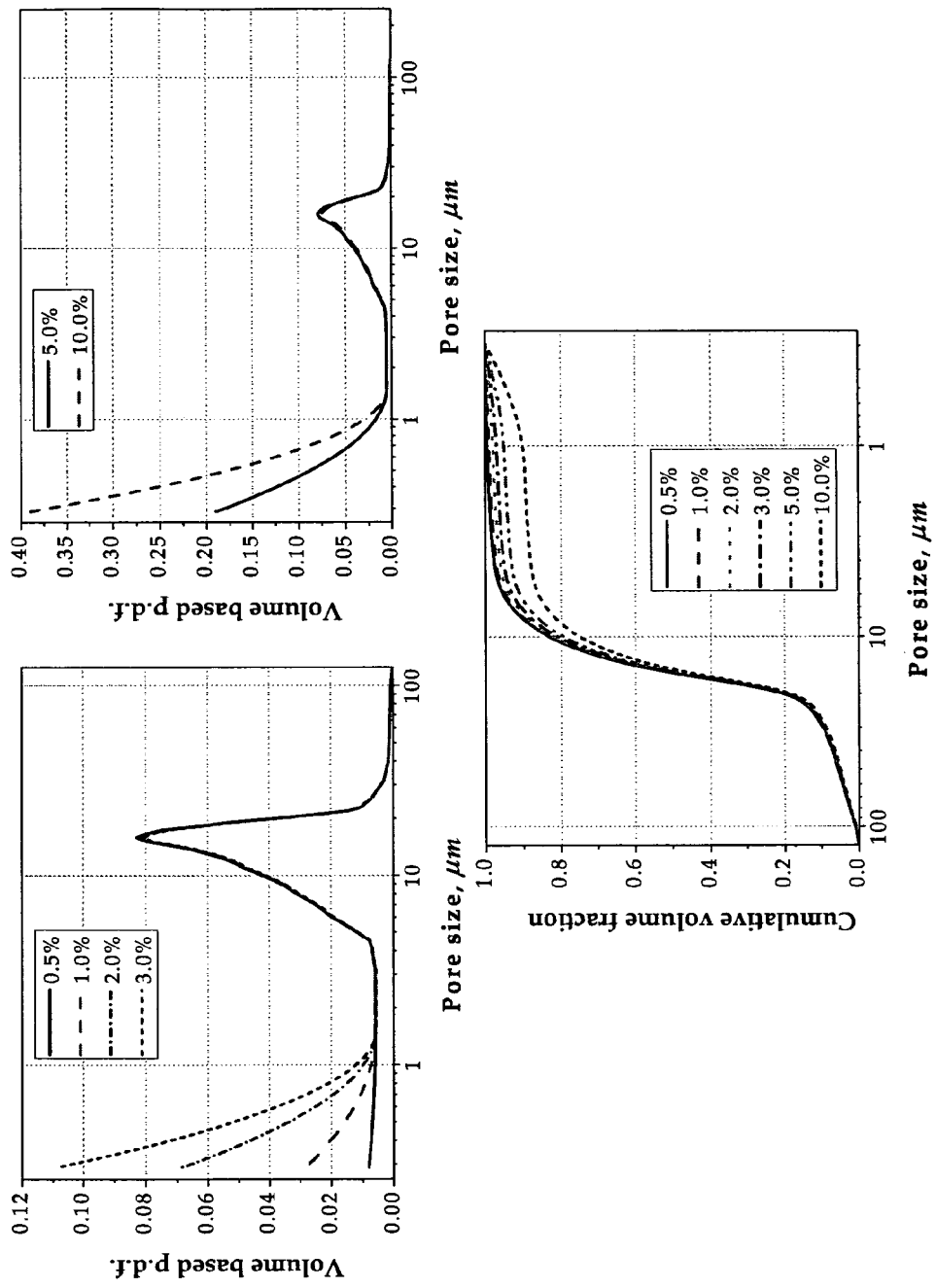
FIG. 7 graphically illustrates a washcoat generated pore size distribution for several exemplary DPF's having 0.5%, 1.0%, 2.0%, 3.0%, 5.0% and 10.0% of submicron pore volume in the total pore volume.

An example of this effect is provided by the data in FIG. 7, which reports numerically generated pore size distributions for the cases of 0.5%, 1.0%, 2.0%, 3.0%, 5.0% and 10.0% of submicron pore volume being present in the total pore volume. The volume based probability distribution functions (p.d.f.) for these pore size distributions are shown along with the cumulative volume fraction of porosity curves for each case. The filter models used to generate the distributions shown were all of the same geometry, mean pore size ($d_{50}$), and bulk (percent) porosity, with only the submicron pore volumes being varied stepwise from 0.5% to 1% over the modeled series.

As is well known in the art, the pore volumes of common porous ceramic filters are generally somewhat reduced (typically by 5-10%) as a result of the coating process. However, if the coating material is allowed to migrate primarily to small pores within the ceramic, then the number of sub-micron pores formed during the coating process will be relatively high. For this reason it is more desirable to direct the washcoating and catalyst coatings toward the relatively large pores of the structure, instead of toward the small pores. In this way, the increase in submicron pores after the deposition of conventional catalyst coatings can be controlled. By controlling submicron pore development as hereinabove described, the resulting permeability of the porous ceramic body, and consequently the filter backpressure even when supporting relatively high levels of trapped soot, can be controlled.

Figure 8:
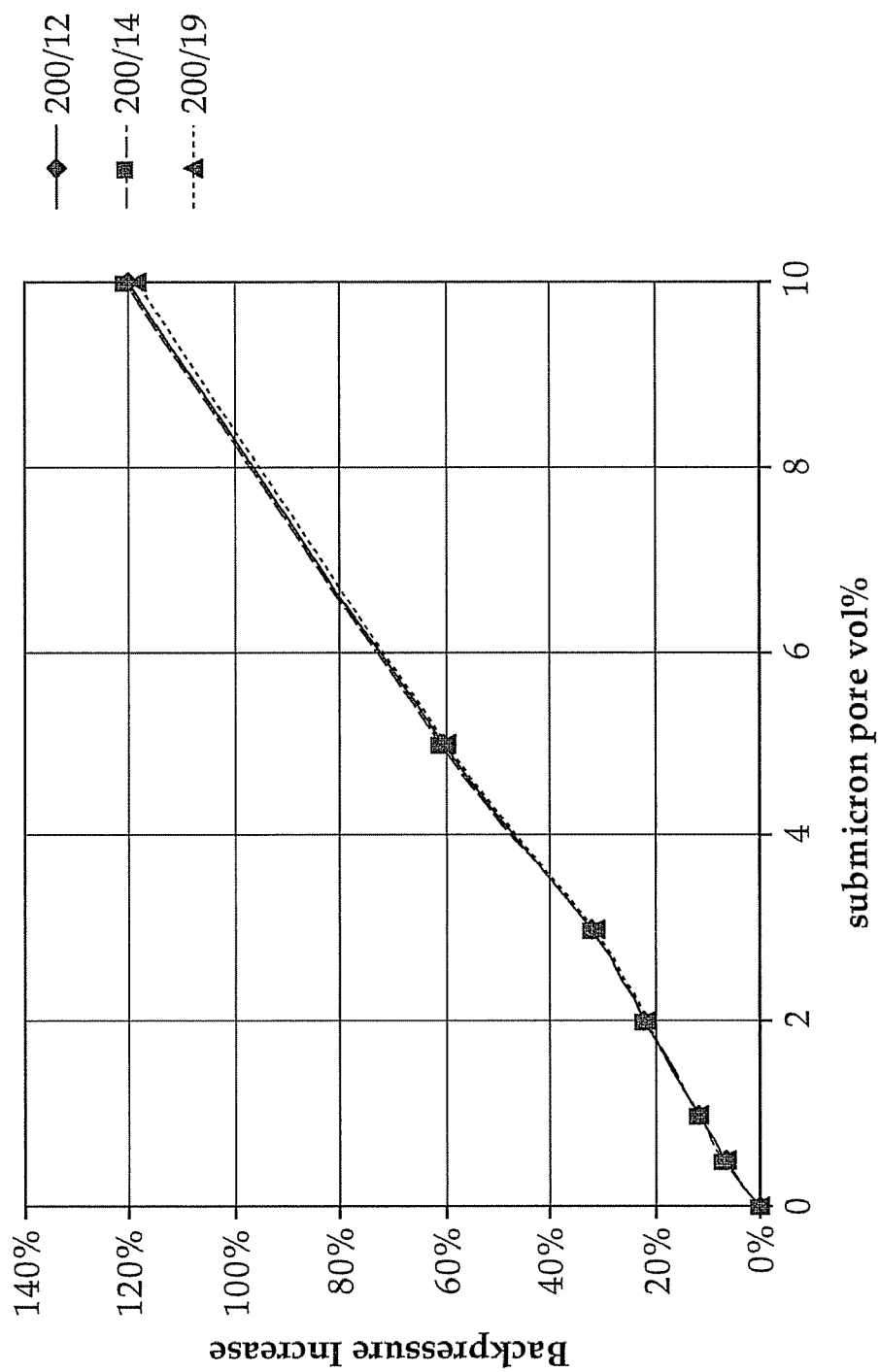
FIG. 8 graphically illustrates the effect of increasing the volume percentage of sub micron pores on resulting backpressures according to one aspect of the present invention.
Figure 9:
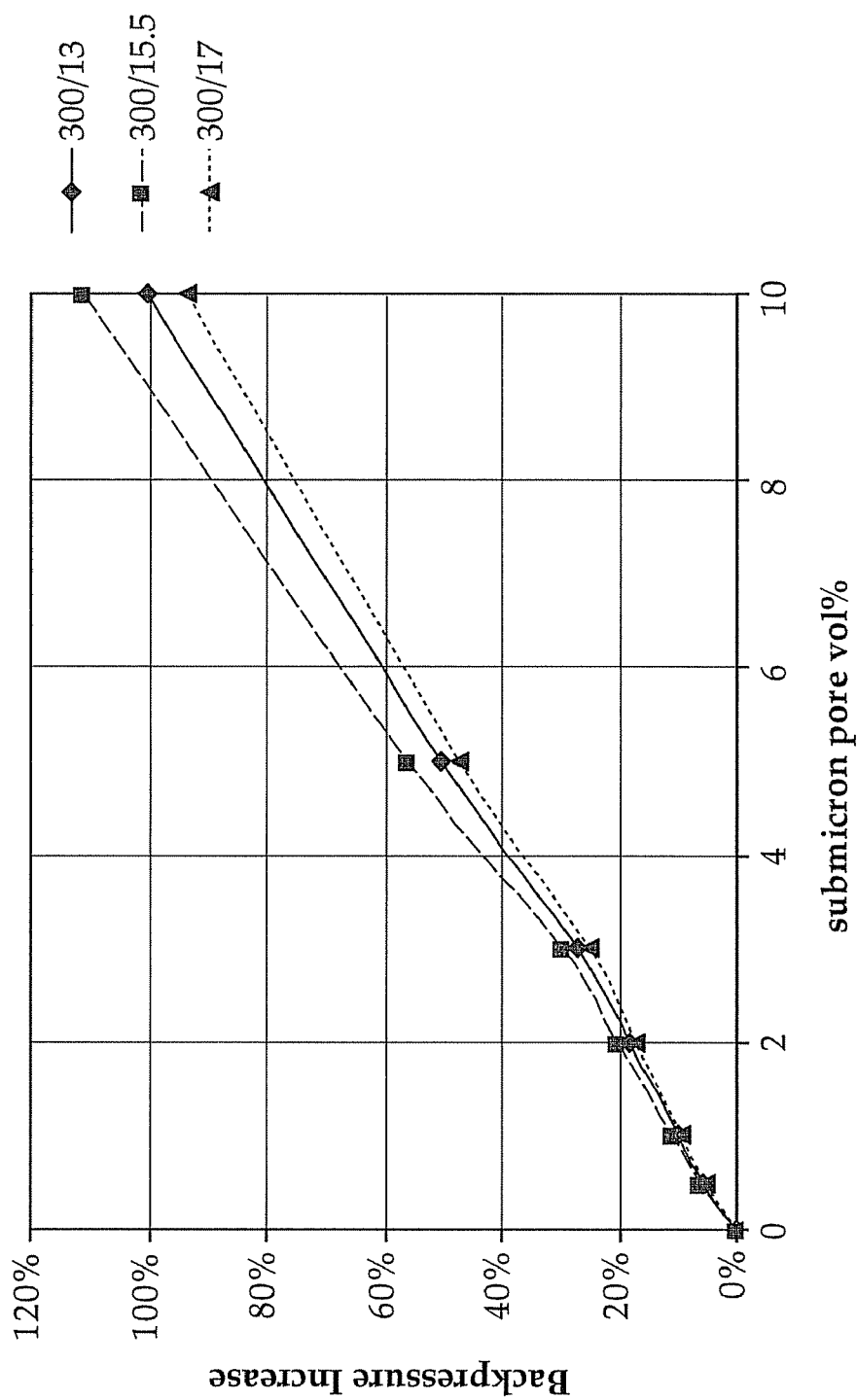
FIG. 9 graphically illustrates the effect of increasing the volume percentage of sub micron pores on resulting backpressures according to one aspect of the present invention.

FIGS. 8 and 9 of the drawing illustrate the effect on soot-loaded filter backpressures of increasing the volume percentage of sub-micron pores in ceramic filters of otherwise equivalent geometry, composition and porosity. FIG. 8 presents numerical CFD modeling data from the backpressure modeling of three ceramic filter bodies, each having a cell density of 200 cells/in$^2$ and wall thicknesses of 0.012, 0.014, and 0.019 inches, respectively (designated in FIG. 8 as 200/12, 200/14, and 200/19, respectively). The data are for the case of an artificial soot loading of 5 grams/L of filter volume and an exhaust gas flow rate of 26.25 SCFM (standard ft$^3$/min). FIG. 9 presents similar modeled data at the same soot loading and exhaust flow rate for ceramic filters having a cell density of 300 cells/in$^2$ and wall thicknesses of 0.013, 0.0155, and 0.017 inches, respectively (designated in FIG. 9 as 300/13, 300/15.5, and 300/17, respectively). The clearly disadvantageous effects of an increasing volume percentage of sub-micron pores on soot-loaded backpressure for porous ceramic filters of conventional commercial filter geometries are evident from these data.

Figure 10:
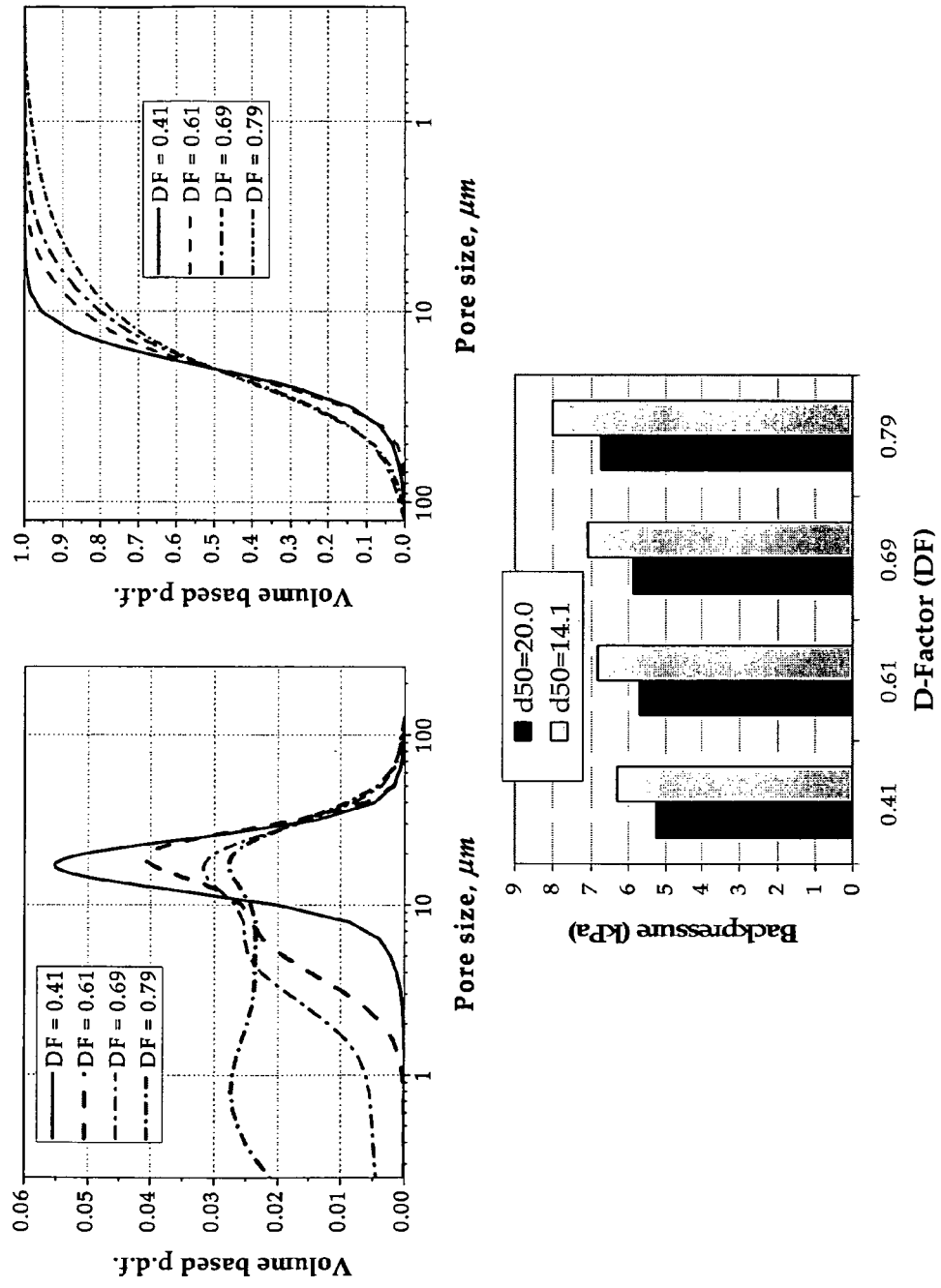
FIG. 10 graphically illustrates a CFD model prediction of the impact of substrate microstructure d-factor on the resulting filter backpressure.

FIG. 10 presents modeled pressure drop data predicting the impact of substrate d-factor on filter backpressure. CFD-simulated 5.66"×6" filter structures having a cell density of 200 cells/in$^2$ and a wall thickness of 0.014 inches are modeled under simulated soot loadings of 5 gram/L and an exhaust flow rate of 210 SCFM. As the data suggests, the modeled backpressures increase with increasing d-factor values, for which reason filters comprising both a low d-factor as well as a low proportion of sub-micron pores, both uncoated and as provided with catalyst coatings, will offer the best combination of filtration efficiency and reduced soot-loaded pressure drops.

Although the foregoing description presents various specific and detailed embodiments of the invention, it will be recognized that such embodiments are illustrative only, and that numerous modifications of the embodiments described may be practiced within the scope of the appended claims.

What is claimed is:

1. A porous ceramic honeycomb body, comprising a sintered phase composition, wherein the ceramic body has a total porosity (% P) defined by a median pore size ($d_{50}$) greater than or equal to 10 microns; a pore size distribution d-factor (pore size d-factor) less than 0.8, wherein the pore size d-factor=$(d_{50}-d_{10})/d_{50}$, and a submicron pore fraction characterized in that less than 5% of the total porosity of the body is comprised of pores having a pore diameter of less than 1.0 micrometer.

2. The porous ceramic honeycomb body of claim 1, wherein the median pore size is in the range of from 10 microns to 30 micrometers.

3. The porous ceramic honeycomb body of claim 2, wherein the median pore size is in the range of from 15 microns to 25 microns.

4. The porous ceramic honeycomb body of claim 1, wherein less than 5% of the total porosity is comprised of pores having a pore diameter in the range of from 0.1 microns to less than 1.0 microns.

5. The porous ceramic honeycomb body of claim 4, wherein less than 5% of the total porosity is comprised of pores having a pore diameter in the range of from 0.3 microns to less than 1.0 microns.

6. The porous ceramic honeycomb body of claim 1, wherein less than 3% of the total porosity is comprised of pores having a pore diameter less than 1.0 microns.

7. The porous ceramic honeycomb body of claim 1, wherein less than 1% of the total porosity is comprised of pores having a pore diameter less than 1.0 microns.

8. The porous ceramic honeycomb body of claim 1, wherein the pore size d-factor is in the range of from 0.1 to 0.8.

9. The porous ceramic honeycomb body of claim 1, wherein the pore size d-factor is in the range of from 0.15 to 0.50.

10. The porous ceramic honeycomb body of claim 1, wherein the total porosity is defined by a median pore size is in the range of from 15 microns to 25 microns, a pore size distribution d-factor in the range of from 0.15 to 0.50, and wherein less than 5% of the total porosity is comprised of pores having a pore diameter in the range of from 0.3 microns to less than 1.0 microns.

11. The porous ceramic honeycomb body of claim 1, wherein the sintered phase composition comprises a cordierite, characterized on an oxide weight basis, consisting essentially of:
 about 49 to about 53 percent by weight $SiO_2$,
 about 33 to about 38 percent by weight $Al_2O_3$, and
 about 12 to about 16 percent by weight MgO.

12. The porous ceramic honeycomb body of claim 1, wherein the sintered phase composition comprises an aluminum titanate composition.

13. The porous ceramic honeycomb body of claim 1, wherein the ceramic honeycomb body further comprises a catalyst washcoat.

14. The porous ceramic honeycomb body of claim 1, wherein the honeycomb body is a wall flow filter comprising a plurality of channels bounded by porous ceramic walls, with selected channels each incorporating a plug sealed to the channel wall.

15. The porous ceramic honeycomb body of claim 14, wherein the honeycomb body is a diesel particulate filter (DPF) suitable for use in diesel exhaust filtration.

16. A porous ceramic honeycomb body of claim 14 wherein a coating incorporating a catalyst is disposed within at least some of the plurality of channels.

* * * * *